Jan. 10, 1933.  A. W. WOODWARD  1,894,251
VEHICLE WHEEL
Filed May 31, 1930
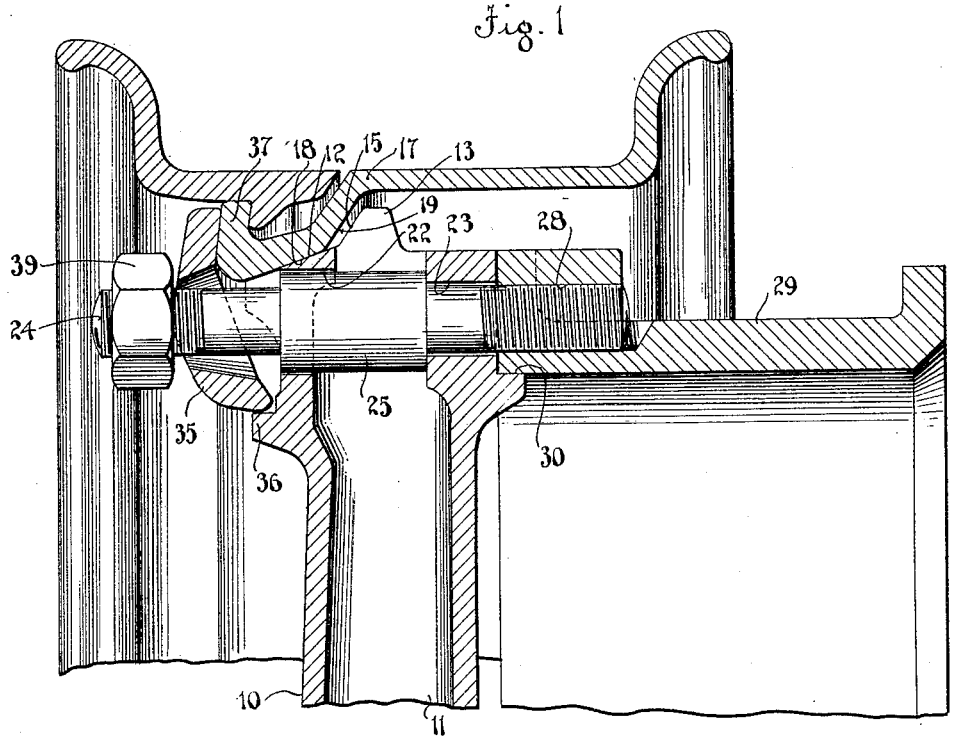
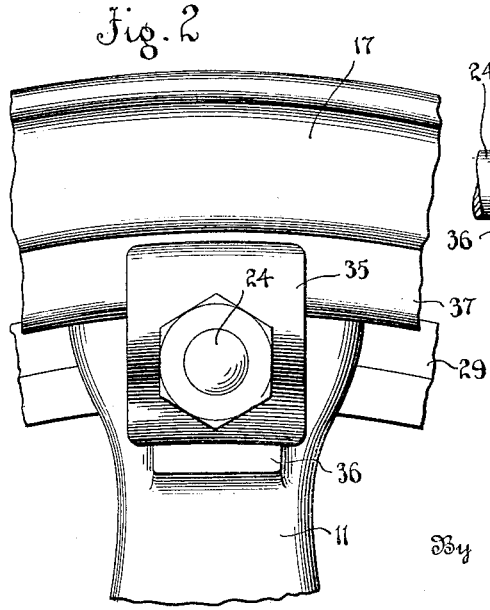
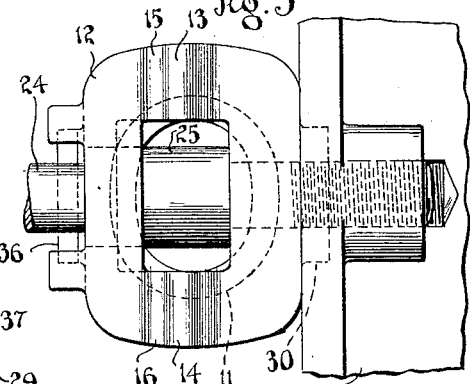
Inventor
Alva W. Woodward
By Bee + Bush
Attorneys Patented Jan. 10, 1933

1,894,251

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

VEHICLE WHEEL

Application filed May 31, 1930. Serial No. 457,859.

This invention relates to vehicle wheels, and it has particular relation to a wheel upon which a pneumatic tire supporting rim is removably secured.

An object of the invention is to provide a novel and inexpensive rim fastening means on the outer periphery of a wheel.

Another object of the invention is to provide a rim fastening means which secures both a rim and a brake on the wheel.

According to prior practices, rims have been secured upon the peripheries of wheels by clamping means including bolts, extending through the wheel and provided with integral heads abutting the inner side of the latter. This invention constitutes an improvement over such mountings in that the bolts are provided with threaded inner ends which engage a brake drum. The opposite ends of the bolts also are threaded and the threads are of such direction that when the rim is clamped on the wheel, tightening of the brake drum also occurs. Also, the bolts are provided with intermediate, enlarged portions for properly locating the bolts and the brake drum, and for reinforcing the rim supporting seats on the wheel.

For a better understanding of the invention, reference may now be had to the accompanying drawing, forming a part of this specification of which:

Fig. 1 is a cross-sectional view of a wheel constructed according to one embodiment of the invention;

Fig. 2 is a fragmentary side view of the construction shown by Fig. 1; and

Fig. 3 is a plan view of the construction shown by Fig. 1, with the rim and rim clamping means removed.

Referring to the figures, a wheel 10 comprises a plurality of hollow spokes only one of which is illustrated as indicated at 11. The outer end of the spoke 11 is provided with a tapered seat 12 and circumferentially spaced ribs 13 and 14 inclined toward the surface 12 as indicated at 15 and 16. A rim 17 is provided with an inclined seat 18 on its inner periphery adapted to be supported on the inclined surface 12 on the end of the spoke, and a second inclined portion 19 adapted to abut the inclined portions 15 and 16 of the ribs 13 and 14, for aligning the rim with the wheel.

Radially inwardly of the seat 12, the spoke is provided with an opening 22 in its outer wall, and a smaller opening 23 extending through its inner wall. It is to be understood that the inner and outer sides of the wheel respectively are the sides adjacent to and at the outer side of the vehicle on which the wheel is mounted. A bolt 24 extending through the openings 22 and 23 is provided intermediate its ends with an enlarged portion or shoulder 25 which abuts at one end the inner wall of the spoke, thereby preventing movement of the bolt laterally in one direction. The part of the shoulder 25 on the bolt disposed in the opening 22 serves as a reinforcement to the rim supporting surface 12 radially outwardly thereof. The inner end of the bolt 24 is threaded and is screwed into an opening 28 provided in a brake drum 29. The brake drum is of cylindrical formation, and the edge of its inner peripheral surface adjacent the spoke rests upon a shoulder 30 on the latter, which serves to locate the brake drum concentrically with respect to the wheel.

The rim is maintained on the surface 12 on the end of the spoke, by a clamp 35 on the outer end of the bolt which is fulcrumed at its radially inner end, on a ledge 36 forming part of the spoke. The radially outer end of the clamp 35 abuts a radially disposed flange 37 on the inner periphery of the rim, and a nut 39 on the outer end of the bolt serves to move the clamp to its operative position.

In a wheel such as that described, tightening of the nut 39 tends to turn the bolt 24 until the latter is tightly secured to the brake drum 29. The shoulder 25 on the bolt 24 prevents lateral movement of the latter in one direction, and the brake drum 29 prevents lateral movement of the bolt in the other direction. Also the shoulder on the bolt reinforces the seat 12 on the end of the spoke, and particularly the portion of the seat that is disposed radially outwardly of the shoulder. The rim is positively aligned with the wheel, because the inclined portion 19 on the inner periphery of the rim abuts the inclined portions 15 and 16 on the ribs 13 and 14. The construction is particularly desirable, because a minimum number of structural elements are required. It should be understood that each spoke is operatively connected to the rim and brake drum in the manner described with respect to the spoke shown.

Although only the preferred form of the invention has been described and shown in detail, it will be apparent to those skilled in the art that the invention is not so limited but that various minor modifications may be made therein, without departing from the spirit of the invention or from the scope of the appended claim.

What I claim is:

The combination with a wheel comprising a spoke having a hollow outer end, a bolt projecting laterally through such end of the spoke, said bolt having an enlarged intermediate portion forming a shoulder, the shoulder abutting the inner wall of the inner side of the spoke to prevent lateral movement thereof in one direction, the enlarged portion being supported by and extending through an enlarged hole in the outer side wall of the spoke, the inner end of the bolt projecting beyond the inner wall of the spoke, and a brake drum secured to such end of the bolt.

In witness whereof, I have hereunto signed my name.

Signed at Akron, in the county of Summit and State of Ohio, U. S. A., this 29th day of May, 1930.

ALVA W. WOODWARD.